No. 622,506. Patented Apr. 4, 1899.
C. E. MANNING.
ILLUMINATING WINDOW GLASS.
(Application filed Apr. 23, 1898.)
(No Model.)
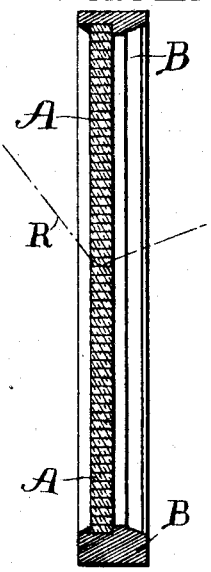
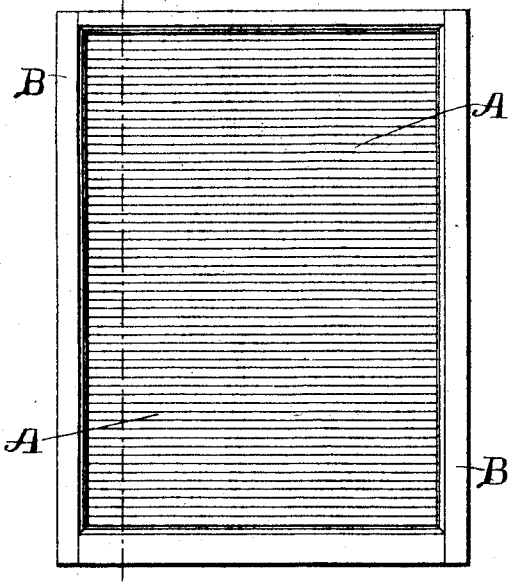
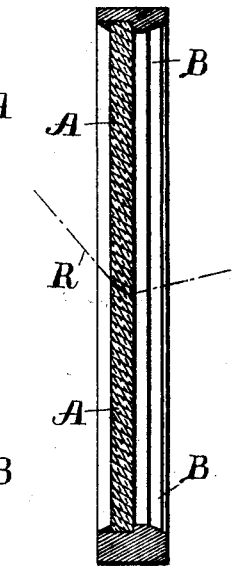
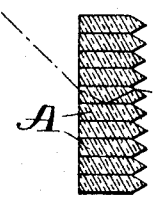
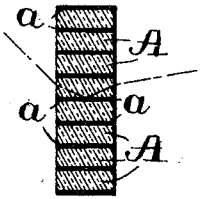
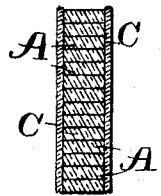
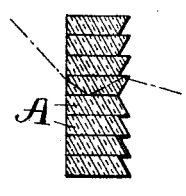
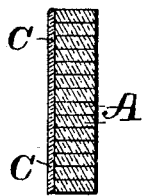
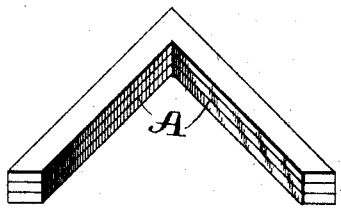
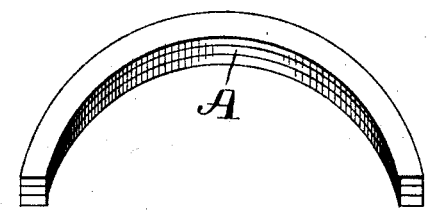
Witnesses
D. H. Blakelock
John Chalmers Nelson
Inventor
C. E. Manning.
by Wilkinson & Fisher,
Attorneys

UNITED STATES PATENT OFFICE.

CHARLES E. MANNING, OF CHICAGO, ILLINOIS.

ILLUMINATING WINDOW-GLASS.

SPECIFICATION forming part of Letters Patent No. 622,506, dated April 4, 1899.

Application filed April 23, 1898. Serial No. 678,638. (No model.)

*To all whom it may concern:*

Be it known that I, CHARLES E. MANNING, a citizen of the United States, residing at Chicago, in the county of Cook and State of Illinois, have invented certain new and useful Improvements in Illuminating Window-Glass; and I do hereby declare the following to be a full, clear, and exact description of the invention, such as will enable others skilled in the art to which it appertains to make and use the same.

My invention relates to improvements in illuminating window-glass for windows, transoms, skylights, and the like, and has for its object to provide an illuminating-glass which possesses good light-reflecting and light-refracting qualities and combines cheapness with utility.

My invention comprises an illuminating-glass made up of a number of narrow strips of flat window-glass fitted together in such manner as to utilize the reflecting and refracting qualities thereof to the best advantage and contemplates the use of waste cuttings from large plates of glass.

Reference is had to the accompanying drawings, wherein the same parts are indicated by the same letters throughout the several views.

Figure 1 represents a view in elevation of a window-light fitted with an illuminating-glass constructed according to the simplest form of my invention. Fig. 2 is a vertical section taken on the line 2 2 in Fig. 1. Fig. 3 is a perspective view illustrating the manner in which the strips of glass are built up one upon another, parts of the said strips being broken away for the sake of better illustration. Fig. 4 is a sectional view similar to that shown in Fig. 2, but illustrating a slight variation of the manner of arranging the strips. Fig. 5 represents a detail view in section, similar to Figs. 2 and 4, enlarged, showing the strips as having angular edges upon the light-discharging side of the illuminating-glass. Fig. 6 represents a detail view, also enlarged and in section, illustrating the use of interposed opaque reflecting strips or substances between the adjacent faces of the strips of glass where such opaque reflecting mediums are necessary to obtain best results in illuminating. Fig. 7 represents a detail view, also in section and enlarged, showing thin plates of ordinary window-glass fitted over the edges of the strips upon the light-receiving and light-discharging faces of the light. Fig. 8 represents a similar view showing a plate of ordinary window-glass fitted upon the light-receiving face of the window-light only. Fig. 9 is a similar view showing the strips of glass as having beveled inner edges. Fig. 10 represents a detail perspective view of an arrangement for an angular panel or illuminating-glass. Fig. 11 is a perspective view of an arrangement for a curved panel; and Fig. 12 is a diagrammatic view illustrating the direction of reflection or refraction of a ray of light entering one edge of a sheet of glass, according to the angle of incidence.

In the simplest form of my invention (shown in Figs. 1 and 2) the illuminating-panel is made up of a number of rectangular strips of ordinary glass A, of greater width than thickness, built up together with their faces adjacent and their width constituting the thickness of the illuminating-panel, the whole being mounted in a suitable frame or sash B. The width of the said individual strips, and therefore the thickness of the panel, bears the ratio of at least two to one to the thickness of the individual strips, as seen in the said figures. The exact measure of light distribution is a question of the thickness of the finished panel relative to the thickness of the individual strips—that is to say, the width of the composing strips relative to their thickness. It is known that a ray of light traveling in a glass medium and approaching a surface at an angle greater than a certain fixed angle will pass out through that face; but if the angle be less than that certain fixed angle the ray of light will be internally reflected and will return in the glass medium, the angle of reflection being equal to the angle of incidence. Thus, referring to Fig. 12, if a ray of light taking the direction shown by the full line X enters the plate of glass P through one edge and approaches the lower surface thereof at an angle less than the critical angle it is internally reflected, as shown at X'; but a ray of light (indicated by the dotted line Y) approaching the same surface of the plate at an angle greater than the critical angle will pass out through said surface, as shown by the dotted line Y'.

Between the adjacent faces of the strips of glass built up upon one another, as hereinbefore described and as shown in Figs. 1 and 2, films of air will find their way, and these films of air will cause the rays of light striking the interior surface of each strip at angles less than the critical angle to be reflected internally by such surface of the glass strip. Under ordinary conditions the effect of these intervening films of air will be sufficient to cause the internal reflection of the desired quantity of rays of light; but occasions will arise, due to the arrangement of the panel with respect to the direction of the entering rays of light, where the interposition of a more or less opaque substance between the adjoining surfaces of the strips of glass will become necessary to produce the desired amount of reflection. For this purpose I may use either a more or less opaque cement or strips of metal or other opaque substance interposed between the adjacent surfaces of the composing strips of glass. Such an arrangement is illustrated in Fig. 6, wherein the interposed opaque reflecting mediums are indicated by the reference-letter $a$.

Where opaque strips are used, the cement, if any is used, should preferably be transparent—such as Canada balsam, commonly used for such purposes. The nature of the opaque reflecting mediums used is not essential, and neither is their employment essential, inasmuch as in the vast majority of cases there will be sufficient reflection without the necessity for the interposition of any opaque reflecting mediums.

Instead of laying the strips of glass perfectly flat, as shown in Figs. 1 and 2, they may be arranged at more or less of an inclination, as shown in Fig. 4.

Both faces of the finished panel may be polished smooth, or the light-discharging face may be made angular by grinding the edges of the strips upon that face into the desired angular contour, as shown in Figs. 5 and 9, for example.

If desired, a thin plate of ordinary window-glass may be fitted upon either or both faces of the panel, as shown in Figs. 7 and 8.

Instead of straight rectangular strips strips cut at various angles or curved strips (shown in Figs. 10 and 11, respectively) may be used where desirable to form an angular or curved panel.

From the foregoing it will be understood that the reflectors, whether they be the surfaces of the strips of glass simply or whether they be interposed opaque reflecting mediums between the adjacent faces of the said strips, should be of a width greater than the distance between the adjacent surfaces of the strips, as well as that the width of such reflecting-surfaces should be greater than the thickness of the individual glass strips, the width of these glass strips being taken in the plane of the thickness of the panel and the thickness of the said strips being taken in a plane parallel to the faces of the panel.

Having thus described my invention, what I claim, and desire to secure by Letters Patent of the United States, is—

1. In an illuminating structure, a panel formed of a series of transparent blocks arranged one in contact with another, in permanent relation, said panel having opposite light-receiving and light-discharging surfaces, the contacting faces of the blocks lying in planes transverse to the light-receiving and light-discharging surfaces, and forming reflecting-surfaces, substantially as described.

2. In an illuminating structure, a panel formed of a series of transparent blocks of greater width than thickness arranged with their faces of greater width in contact, receiving and discharging light through the faces of their lesser dimension corresponding with their thickness, and reflecting light at their contacting faces by virtue of the films of air between said contacting faces, substantially as described.

3. In an illuminating structure, a panel formed of a series of transparent rectangular blocks of greater width than thickness arranged with the faces corresponding to their width in close proximity, receiving and discharging light through the faces corresponding with their thickness, and reflecting light at their faces corresponding with their width, substantially as described.

4. In an illuminating structure, a panel formed of a series of flat transparent blocks of greater width than thickness, arranged with the faces corresponding to their width in contact, and having the faces corresponding to their thickness exposed upon the opposite faces of the panel, substantially as described.

5. In an illuminating structure, a panel formed of a series of flat transparent blocks of greater width than thickness, arranged with the faces corresponding to their width in contact, and having the faces corresponding to their thickness exposed upon the opposite faces of the panel and ground to a smooth surface upon either side thereof, substantially as described.

6. In an illuminating structure, a panel comprising transparent strips arranged one above the other, said panel receiving and discharging light through opposite faces of said strips, and said panel having light-reflecting surfaces at opposite faces of each of said strips, at an angle to such light-receiving and light-discharging surfaces, said light-reflecting surfaces being of greater width than the distance between the two opposite reflecting-surfaces of a strip, substantially as described.

7. In an illuminating structure, a panel formed of a series of transparent blocks arranged one in contact with another in permanent relation; said panel having opposite light-receiving and light-discharging surfaces, the contacting faces of said blocks lying in planes inclined from a perpendicular with respect to the light-receiving and light-discharging surfaces, and forming reflecting-surfaces, substantially as described.

8. In an illuminating structure, a panel formed of a series of transparent blocks arranged one in contact with another in permanent relation, and a transparent sheet fitted upon one face of said panel in contact with said blocks; said panel having opposite light-receiving and light-discharging surfaces, and the contacting faces of the blocks lying in planes transverse to the light-receiving and light-discharging surfaces and forming reflecting-surfaces, substantially as described.

9. In an illuminating structure, a panel formed of a series of transparent blocks arranged one in contact with another in permanent relation, and transparent sheets fitted upon the faces of said panel in contact with said blocks; said panel having opposite light-receiving and light-discharging surfaces, and the contacting faces of the blocks lying in planes transverse to the light-receiving and light-discharging surfaces, and forming reflecting-surfaces, substantially as described.

In testimony whereof I affix my signature in presence of two witnesses.

CHARLES E. MANNING.

Witnesses:
    ROBERT F. PIPER,
    E. A. COLVIN.